(12) United States Patent
Kong et al.

(10) Patent No.: US 9,346,199 B2
(45) Date of Patent: May 24, 2016

(54) APPARATUS AND METHOD FOR MANUFACTURING CRASH PAD

(71) Applicants: Hyundai Motor Company, Seoul (KR); Kia Motors Corporation, Seoul (KR)

(72) Inventors: Byung Seok Kong, Gyeonggi-do (KR); Ji Min Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 94 days.

(21) Appl. No.: 13/966,783

(22) Filed: Aug. 14, 2013

(65) Prior Publication Data

US 2014/0162019 A1   Jun. 12, 2014

(30) Foreign Application Priority Data

Dec. 12, 2012   (KR) ........................ 10-2012-0144400

(51) Int. Cl.
*B29C 44/12* (2006.01)
*B32B 33/00* (2006.01)
(Continued)

(52) U.S. Cl.
CPC ........... *B29C 44/1219* (2013.01); *B29C 44/086* (2013.01); *B29C 44/1238* (2013.01); *B32B 33/00* (2013.01); *B29C 33/34* (2013.01); *B29C 33/36* (2013.01); *B29C 44/1223* (2013.01); *B29C 44/1228* (2013.01); *B29C 44/1257* (2013.01); *B29C 45/1645* (2013.01); *B29C 45/33* (2013.01); *B29C 2045/1648* (2013.01);
(Continued)

(58) Field of Classification Search
CPC .... B29C 33/34; B29C 33/36; B29C 44/1223; B29C 44/1228; B29C 44/1233; B29C 44/1257; B29C 45/33; B29C 45/1645; B29C 2045/1648; B29C 2045/1653; B29C 2045/1654; B29C 2045/1656; B29C 2045/334; B29C 2045/338; B29C 44/1219; B29C 44/1238; Y10T 428/24033; Y10T 428/2405
USPC ......... 425/4 R, 112, 125, 127, 130, 134, 388, 425/451, 454, 817 R
See application file for complete search history.

(56) References Cited

U.S. PATENT DOCUMENTS 4,233,006 A * 11/1980 Panas ............................. 425/4 R
4,698,001 A * 10/1987 Vismara ........................ 425/4 R
(Continued)

FOREIGN PATENT DOCUMENTS

DE        19704623 A1 *  8/1998  .............. B29C 44/06
JP        2003326605 A   11/2003
(Continued)

*Primary Examiner* — Seyed Masoud Malekzadeh
(74) *Attorney, Agent, or Firm* — Mintz Levin Cohn Ferris Glovsky and Popeo, P.C.; Peter F. Corless

(57) ABSTRACT

An apparatus and method for manufacturing a crash pad with a foaming layer formed by injecting a foaming solution between a core and a skin are disclosed. The apparatus includes a first mold and a second mold used to form the skin by injecting molten resin of a skin material into a skin forming cavity when the first and second molds are combined. In addition, a third mold and the fourth mold form the core by injecting molten resin of a core material into a core forming cavity when the third and fourth molds are combined. The first mold has a vacuum aperture in an inner surface of the first mold to adsorb and fix a thread to implement a stitch before the forming of the skin, and the vacuum aperture exerts a vacuum suctioning force to absorb and fix via a vacuum pressure applied from a vacuum pressure providing unit.

13 Claims, 10 Drawing Sheets

(51) Int. Cl.
*B29C 44/08* (2006.01)
*B29C 45/16* (2006.01)
*B29C 45/33* (2006.01)
*B29C 33/36* (2006.01)
*B29C 33/34* (2006.01)

(52) U.S. Cl.
CPC .......... *B29C 2045/1653* (2013.01); *B29C 2045/1654* (2013.01); *B29C 2045/1656* (2013.01); *B29C 2045/334* (2013.01); *B29C 2045/338* (2013.01); *Y10T 428/2405* (2015.01); *Y10T 428/24033* (2015.01)

(56) References Cited

U.S. PATENT DOCUMENTS

| | | | |
|---|---|---|---|
| 4,758,394 A * | 7/1988 | Yaita et al. | 264/51 |
| 5,044,919 A * | 9/1991 | Hama et al. | 425/443 |
| 5,238,387 A * | 8/1993 | Hama et al. | 425/388 |
| 5,304,050 A * | 4/1994 | Vismara | 425/4 R |
| 5,460,497 A * | 10/1995 | Vismara | 425/4 R |
| 5,482,661 A * | 1/1996 | Vismara | 264/413 |
| 7,588,814 B2 | 9/2009 | Olley et al. | |
| 7,897,094 B2 * | 3/2011 | Kong | 264/328.8 |
| 2002/0121715 A1 * | 9/2002 | Sandefer et al. | 264/46.4 |
| 2006/0220274 A1 * | 10/2006 | Dooley et al. | 264/259 |
| 2008/0136145 A1 * | 6/2008 | Kong | 280/728.3 |
| 2009/0283993 A1 | 11/2009 | Finch et al. | |
| 2010/0013124 A1 * | 1/2010 | Kong | 264/328.8 |
| 2013/0001819 A1 * | 1/2013 | Buono | 264/46.4 |

FOREIGN PATENT DOCUMENTS

| | | |
|---|---|---|
| JP | 2005254716 A | 9/2005 |
| JP | 2007038781 A | 2/2007 |

* cited by examiner

APPARATUS AND METHOD FOR MANUFACTURING CRASH PAD

CROSS-REFERENCE TO RELATED APPLICATION

This application claims under 35 U.S.C. §119(a) the benefit of Korean Patent Application No. 10-2012-0144400 filed Dec. 12, 2012, the entire contents of which are incorporated herein by reference.

BACKGROUND (a) Technical Field

The present invention relates to an apparatus and method for manufacturing a crash pad. More particularly, the present invention relates to an apparatus and method for manufacturing a crash pad, which can improve the productivity and decrease the costs for equipment and manufacturing by reducing the number of molds, the number of installation components and the number of processes and omitting the handwork, and can increase the degree of freedom of embossment design on the surface of a skin while overcoming an excessive loss due to a leakage of foaming liquid.

(b) Background Art

In general, crash pads are used as an interior material installed at front of driver and passenger seats to protect passengers at the time of collision between the passengers and the crash pad due to a vehicle accident. These crush pads are formed of foaming materials to achieve elastic cushion performance and impact absorbing characteristics to a certain degree while providing an aesthetically enhanced surface condition.

Crash pads for a vehicle usually include a skin which is a surface material that provides an enhanced aesthetic surface condition and a core that serves as a framework of the crash pad inside the skin. A foaming layer such as polypropylene (PP) foam and/or polyurethane (PU) foam is interposed between the skin and the core to provide cushioning performance and impact absorbing performance.

FIG. 1 is an exemplary view illustrating a process of manufacturing a typical crash pad. A core 1, a skin 2, and a foaming layer 3 are formed by a polymer injection molding method, a vacuum adsorption molding method and a foaming molding method, respectively, all processes of which will be described in detail with reference to FIG. 1 as follows.

First, a polymer resin material 1a is injected at a lower pressure into an injection mold including upper and lower molds 4 and 5 to form a core 1, and separately, the skin 2 that is preheated in a male type of vacuum forming mold 6 is inserted and molded by the vacuum adsorption method.

In particular, although not shown in the drawing, fine vacuum apertures for vacuum adsorbing the skin 2 in the vacuum forming mold 6 are formed in the vacuum forming mold 6, and the vacuum apertures are connected to one passageway in the mold and then connected to a large capacity of an external vacuum pump. Additionally, foaming liquid 3a is injected into the core 1 of lower mold 5, and then a forming upper mold 7 attached to the skin 2 is closed, compressing and joining the skin 2 attached to the upper mold 7 onto foaming liquid 3a of the lower mold 5.

Thereafter, an unnecessary edge portion (e.g., leakage portion of foaming liquid) of the skin 2 and the foaming layer 3 that are formed is cut and removed (e.g., trimming), or the edge portion of the skin 2 is adhered and fixed to the core 1 by an adhesive such that the foaming layer 3 is covered.

However, this typical manufacturing method has limitations as follows.

First, since the core 1, the skin 2 and the foaming layer 3 need to be molded at separate molds, respectively, a total of three molds (e.g., core injection upper and lower mold, vacuum forming mold, and foaming upper mold) are required to manufacture the crash pad. Thus, there is a limitation in that the investment and manufacturing cost such as molding cost increase.

Furthermore, since the lower mold 5 and the foaming upper molding 7 is opened at the edge portion of a cavity even when in closed state, a leakage of foaming liquid may occur at the opened edge portion thus, causing an excessive loss of foaming liquid and an increase of the manufacturing cost.

As described in FIG. 1D, after the manufacturing, a separate process in which the edge portion of the skin 2 and the edge portion solidified due to the leakage of foaming liquid are separately cut or only a leakage portion is cut and then the edge portion of the skin 2 is covered and adhered by an adhesive is required to manufacture the crash pad. Additionally, since foaming liquid needs to be injected into the opened cavity (e.g., foaming cavity), there may be difficulty in accurately maintaining and controlling the injection temperature of foaming liquid within a regulated temperature range.

In addition, in a structure in which the foaming cavity is opened or foaming liquid is capable of leaking, the foaming layer 3 needs to be designed to have a substantially uniform thickness of about 5 mm or more due to early solidification of foaming liquid. This may be a cause of reducing the design degree of freedom of the crash pad (e.g., limitation of open foaming).

In order to solve these limitations, a molding apparatus has been proposed that seals the foaming cavity by adhering the edge portion of the skin closely to the core using a slide mold while integrating the vacuum foaming mold and the foaming upper mold into one common mold. This provides a benefit of solving a limitation of an excessive loss of foaming liquid, and enables the improvement of the design degree of freedom of the crash pad.

FIG. 2 is an exemplary view illustrating a typical foaming integrated injection molding apparatus including a slide mold that prevents a leakage of foaming liquid. In an apparatus for manufacturing a crash pad, the crash pad may be manufactured by an In-Mold Grain (IMG) foaming integrated injection molding method. Specifically, the IMG foaming process refers to a method in which a skin is molded through skin heating and vacuum suctioning in a mold and simultaneously an embossment is formed on the surface of the skin by forming the embossment on the inner surface of the mold (e.g., vacuum forming mold) to form a skin (e.g., thermoplastic olefin (TOP) material).

As shown in the drawing, when the core injection molds 10 and 11 are combined, resin may be injected into the mold to form a core 1, and simultaneously, a skin 2 is formed by vacuum adsorption in a vacuum forming mold 12. Thereafter, the mold is rotated and transferred by an upper rotating unit to allow the vacuum forming mold 12 with the skin 2 to combine with the lower mold 11 with the core 1, and then foaming liquid is injected and foamed between the core 1 and the skin 2 to form a foaming layer 3.

When foaming liquid is injected, the slide mold 12a allows the edge portion of the skin 2 to adhere closely to the core 1 to seal a foaming cavity. In particular, the slide mold 12a moves forward by a predetermined distance for the sealing during the foaming, and then fixed to maintain the sealing. After the foaming, the slide mold 12a moves backward to eject a product.

As shown in FIG. 3, the sealing is performed while a sealing protrusion part 1c formed on core 1 is overlapped with the skin 2. Thus, preventing the foaming liquid from leaking by the sealing protrusion part 1c.

This molding apparatus may substantially prevent a leakage of foaming liquid, and a part of molds are used in common, thereby reducing the number of molds, the mold cost, and the investment and manufacturing cost.

However, since an edge portion of the skin 2 is located under the slide mold 12a, the edge portion of the skin 2 needs to be cut separately, or an end finishing process (e.g., end wrapping process) of the skin 2 needs to be performed.

In a conventional crash pad manufacturing apparatus of the prior art, when the slide mold moves forward, the edge portion of the skin attached to a vacuum forming mold is bent toward the end of a core to allow the edge portion of the skin to adhere closely to the core. Thus, the foaming cavity may be entirely sealed by the edge portion of the skin adhering closely to the end of the core during the foaming process.

When foaming liquid is injected into the sealed forming cavity, a foaming layer may be formed in the sealed foaming cavity without a leakage of foaming liquid. Additionally, the skin end finishing process (e.g., end wrapping process) may be automatically performed while the edge portion of the skin bent by the slide mold is joined and fixed to the end portion of the foaming layer. Thus, a leakage of foaming liquid may be solved, and the cutting process or the wrapping process that has been manually performed may both be omitted. In addition, the productivity may be improved.

Moreover, according to another conventional molding apparatus, as shown in FIG. 2, since the vacuum adsorption molding of the skin is performed, apparatuses for the vacuum adsorption molding, i.e., an expensive mold with fine vacuum apertures, a vacuum pump for the material adsorption, and a heater for heating a material before the molding are required.

FIG. 4 is an exemplary view illustrating a heater and a vacuum pump together with a molding apparatus. As shown in FIG. 4, a vacuum pump 13 that applies a vacuum pressure to a vacuum aperture of a vacuum forming mold 12 and a heater 14 that heats a skin material 2a before the skin material 2a is adsorbed to the vacuum forming mold 12 are provided.

To manufacture a crash pad by an IMG foaming integrated injection molding method using the vacuum pump 13 and the heater 14, the vacuum forming mold 12 that forms a fine embossment on the skin material (e.g., TPO sheet) 2a without an embossment, particularly, an expensive nickel electroforming mold with fine vacuum apertures (e.g., fine apertures of 50 μm to 200 μm) formed throughout the inner surface of the mold to adsorb the skin material 2a to the inner surface of the mold are required. The heater 14 is needed to heat the skin material 2a before the mold adsorption, and a separate transfer device (not shown) that transfers the heated skin material 2a to the vacuum forming mold 12 are required.

In addition, the embossment may be formed on the surface of the skin only when the entire skin material can be adsorbed and fixed to the inner surface of the mold by applying a vacuum pressure via the vacuum aperture of the mold 12 and the material is strongly adsorbed to allow the surface portion of the skin material to be inserted into the embossment portion on the inner surface of the mold. Accordingly, a vacuum pressure that forms a strong suctioning force is required, and thus, a large capacity of vacuum pump and tank are required.

Finally, there is a limitation in that the equipment cost increases due to the installation of a nickel electroforming mold, a heater, a transfer device, and a large capacity of vacuum pump and tank.

Hereinafter, a limitation regarding the product quality will be described with reference to FIGS. 5 and 4. FIG. 5 is an exemplary cross-sectional view illustrating a skin during the vacuum forming, and FIG. 4 is an exemplary view of a part 'A'.

FIG. 5 illustrates: (a) the skin material 2a heated by the heater and inserted into the mold 12; (b) molding performed while the skin material 2a is vacuum adsorbed to the inner surface of the mold by a vacuum suctioning force through a fine vacuum aperture of the mold 12; and (c) a state after the molding, which shows a typical limitation.

When a vacuum suctioning force is applied during the molding (b), the surface portion of the skin material 2a is inserted into the concave embossment on the inner surface of the mold, and then a convex embossment 2b is formed on the finally formed skin 2 as shown in FIG. 5. In particular, in the IMG embossment molding method using the vacuum adsorption, the quality deterioration may occur as shown in FIG. 5, which is caused by the shrinkage and rebounding of the embossment 2b of the skin 2 when the vacuum is released after the molding.

Additionally, to form the embossment 2b in the skin 2, the surface portion of the skin material 2a must be inserted into the embossment portion 12b on the inner surface of the mold 12 by the vacuum suctioning force. In this case, an excessive vacuum time is spent, and thus the productivity decreases.

Furthermore, in the vacuum adsorption method, it may be difficult to form a sharp portion and deal with an undercut portion. In addition, when trying to implement a stitch 2c on the surface of the skin 2, the stitch 2c is also formed by the embossment portion 12b in the inner surface of the mold 12. In particular, the stitch 2c is a portion of the skin surface that protrudes at a specific location, corresponding to the shape of the stitch on the surface of the skin 2.

Accordingly, as shown in FIG. 6, there is a limitation in that only a stitch having the same color as the skin 2 can be implemented and the realistic feeling of the stitch 2c is deteriorated.

The above information disclosed in this Background section is only for enhancement of understanding of the background of the invention and therefore it may contain information that does not form the prior art that is already known in this country to a person of ordinary skill in the art.

SUMMARY

The present invention provides an apparatus and method for manufacturing a crash pad, which can improve the productivity and decrease the costs for equipment and manufacturing by reducing the number of molds, the number of installation components and the number of processes and omitting the handwork, and may increase the degree of freedom of embossment design on the surface of a skin while overcoming an excessive loss due to a leakage of foaming liquid.

The present invention also provides an apparatus and method for manufacturing a crash pad, which may improve the realistic feeling of a stitch formed on the surface of a skin.

In one aspect, the present invention provides an apparatus for manufacturing a crash pad with a foaming layer formed by injecting foaming solution between a core and a skin, the apparatus including: a first mold and a second mold that form the skin by injecting molten resin of a skin material into a skin forming cavity when the first and second molds are combined; and a third mold and a fourth mold that form the core by injecting molten resin of a core material into a core forming cavity when the third and fourth molds are combined, wherein the first mold has a vacuum aperture in an inner surface of the first mold to adsorb and fix a thread that implements a stitch before the forming of the skin, and the vacuum aperture exerts a vacuum suctioning force that absorbs and fixes via a vacuum pressure applied from a vacuum pressure providing unit.

In another aspect, the present invention provides a method for manufacturing a crash pad with a foaming layer formed by injecting foaming solution between a core and a skin, the apparatus including: adsorbing and fixing a thread to an internal surface of a first mold to block a vacuum aperture when a vacuum pressure is applied to the vacuum aperture, the thread forming a stitch part on a surface of the skin; forming the skin by injecting molten resin of a skin material when the first mold and a second mold are combined; forming the core by injecting molten resin of a core material when a third mold and a fourth mold are combined; and forming a foaming layer by injecting foaming liquid into a foaming cavity between the core and the skin after the mold is opened and then the first mold fixed with the skin and the fourth mold attached with the core are combined.

In still another aspect, the present invention provides a crash pad manufactured by the above method, the crash pad including a stitch part comprising: an exposure part having a thread exposed on a surface of a skin; and a hidden part having the thread buried in the surface of the skin.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
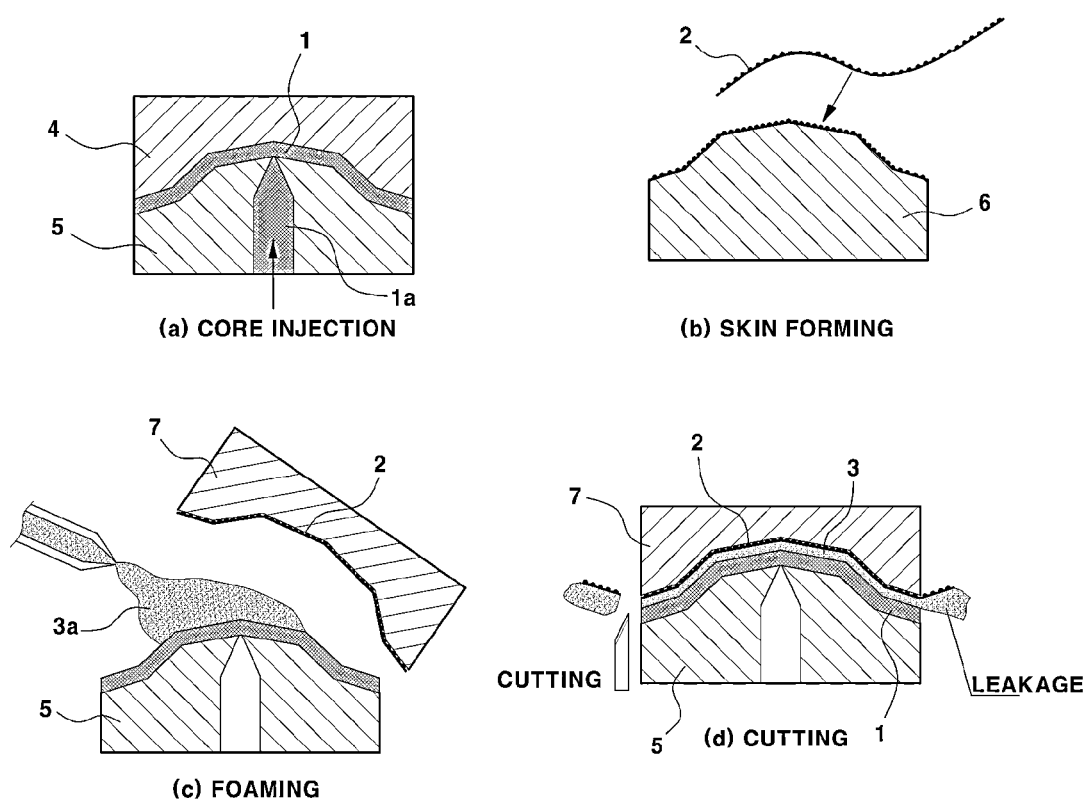
FIG. 1 is an exemplary view illustrating a process of manufacturing a typical crash pad according to the related art.
Figure 2:
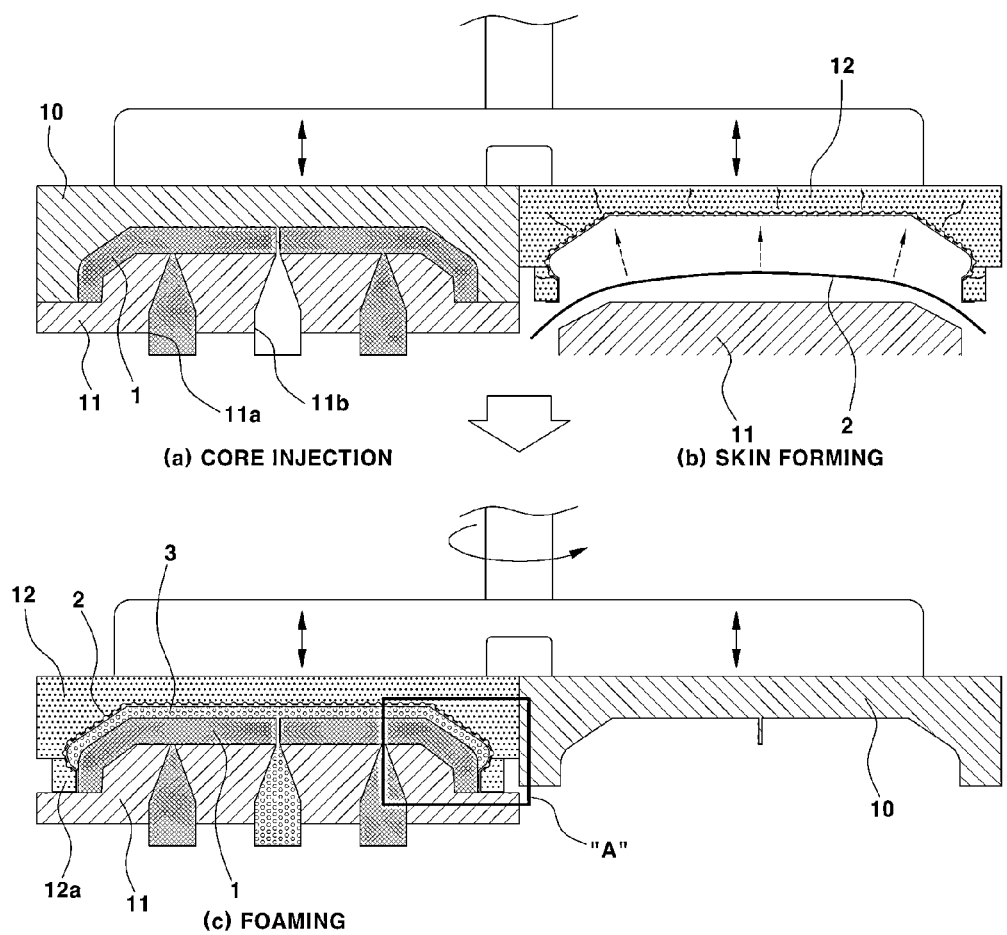
FIG. 2 is an exemplary view illustrating a typical foaming integrated injection molding apparatus comprising a slide mold according to the related art.
Figure 3:
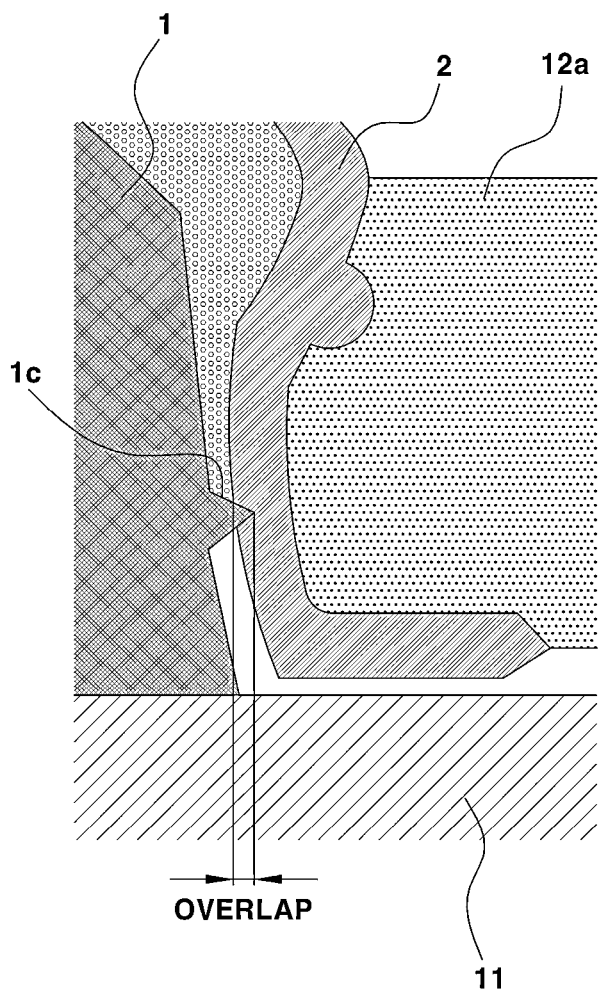
FIG. 3 is an exemplary cross-sectional view of a part 'A' of FIG. 2 according to the related art.
Figure 4:
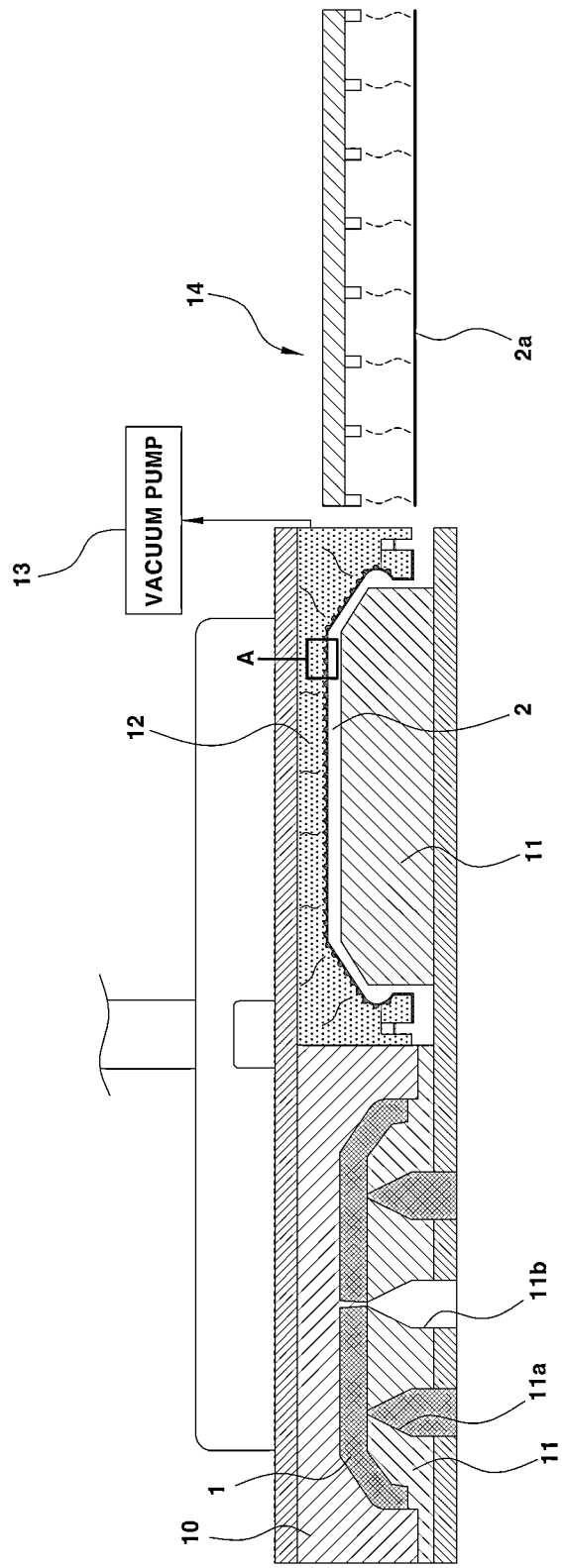
FIG. 4 is an exemplary view illustrating a typical molding apparatus and auxiliary installations including a heat and a vacuum pump according to the related art.
Figure 5:
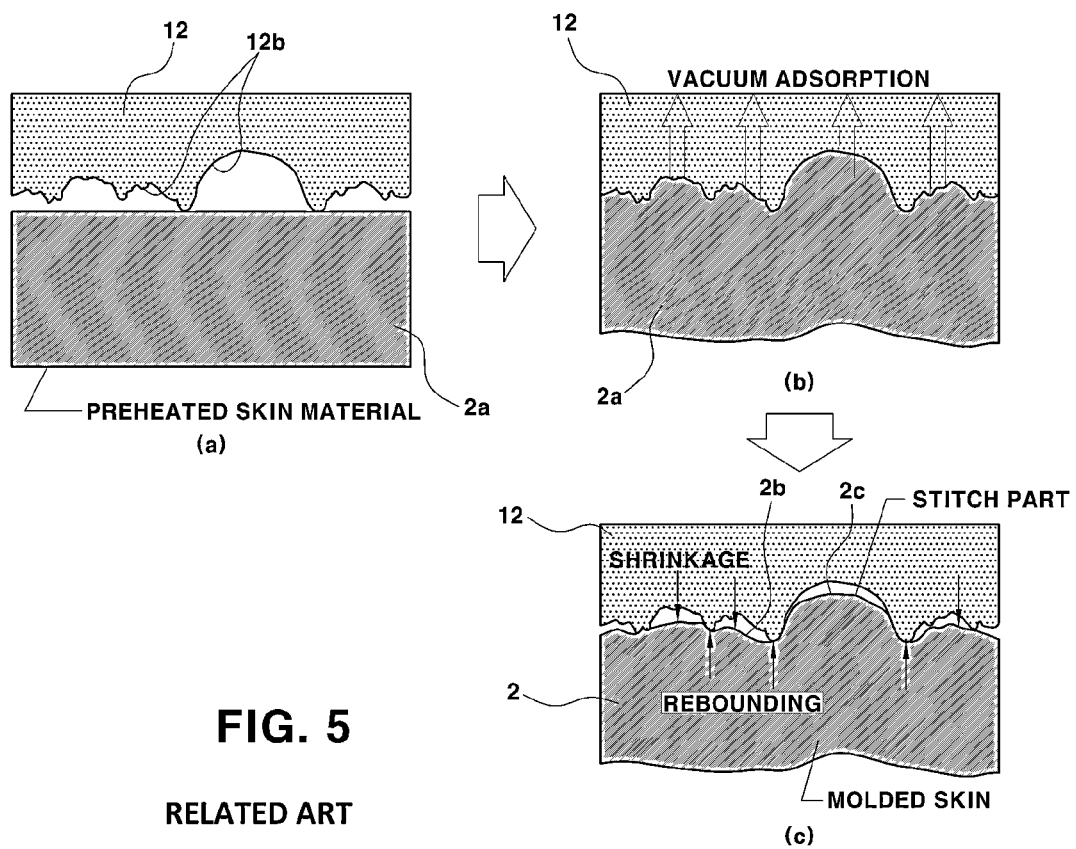
FIG. 5 is an exemplary cross-sectional view illustrating a skin during a typical vacuum adsorption forming according to the related art.
Figure 6:
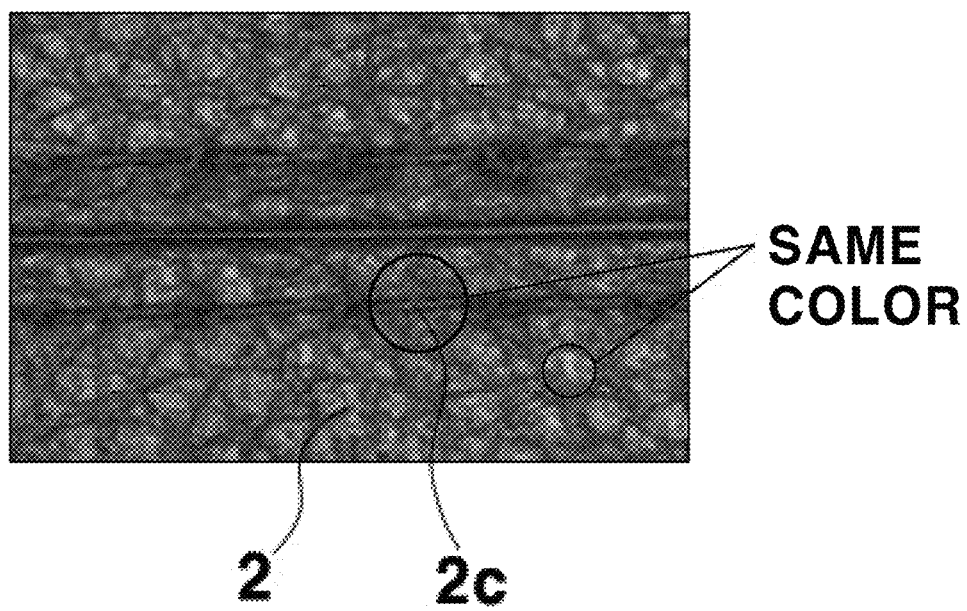
FIG. 6 is an exemplary view illustrating the surface of a skin manufactured by a typical method according to the related art.

Reference numerals set forth in the Drawings includes reference to the following elements as further discussed below:

| | |
|---|---|
| 1: skin | 2: core |
| 3: forming layer | 110: first mold |
| 111: slide mold | 112: embossment |
| 113: fixing groove | 114: vacuum aperture |
| 115: thread | 115a: exposure part |
| 115b: hidden part | 120: second mold |
| 121: slide mold | 122: injection passage |
| 130: third mold | 140: fourth mold |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so that those skilled in the art can easily carry out the present invention.

In an exemplary embodiment of present invention a skin may be manufactured using an injection molding method instead of a vacuum adsorption molding method and an actual thread may be fixed on the surface of a skin to implement a stitch upon injection molding of the skin.

The present invention may be applied to the manufacture of a crash pad using an In-Mold Grain (IMG) foaming integrated injection method. Since an injection molding method may be used to form a skin instead of a typical vacuum adsorption molding method, a steel injection mold (e.g., formed of a steel alloy material) may be used instead of an expensive nickel electroforming mold. In particular, similarly to the nickel electroforming mold (e.g., vacuum forming mold), an embossment pattern (e.g., concave embossment) may be formed in the inner surface of the steel injection mold.

However, the steel injection mold may have less vacuum apertures to adsorb and fix a thread unlike the nickel electroforming mold in which fine vacuum apertures are evenly formed throughout the inner surface of the mold. In other words, in a typical vacuum forming mold that forms a skin, since the skin needs to be adsorbed and fixed to be transferred to a foaming process and the embossment part needs to be vacuum adsorbed using a vacuum suctioning force applied through a vacuum aperture, a number of vacuum apertures must be evenly provided throughout the skin.

However, in the present invention, since the embossment part of the skin may be formed using the injection molding method, a vacuum aperture inside the fixing groove that fixes a thread as described later has only to be provided in the skin forming mold. Accordingly, less vacuum apertures are required.

For reference, a means that fixes the injection molded skin to the mold for transfer to the foaming process may include the vacuum apertures (and the vacuum suctioning force) and a slide mold of a skin forming upper mold described later. In particular, the vacuum suctioning force may assist the fixing force using the slide mold. Additionally, in a typical vacuum adsorption forming method, a suctioning force stronger than the suctioning force for fixing the skin to form embossment in the surface of the skin needs to be applied. However, in the present invention, since a vacuum pressure needs only to be applied to allow the thread and the skin to be adsorbed and fixed to a less number of vacuum apertures, a relatively small capacity of vacuum pressure providing unit, i.e., a small capacity of vacuum pump or tank may be used. In addition, since an injection mold method is used to form the skin in the mold, a transfer device and a heater needed for material heating (e.g. preheating) in the vacuum adsorption molding may be omitted.

Figure 7A:
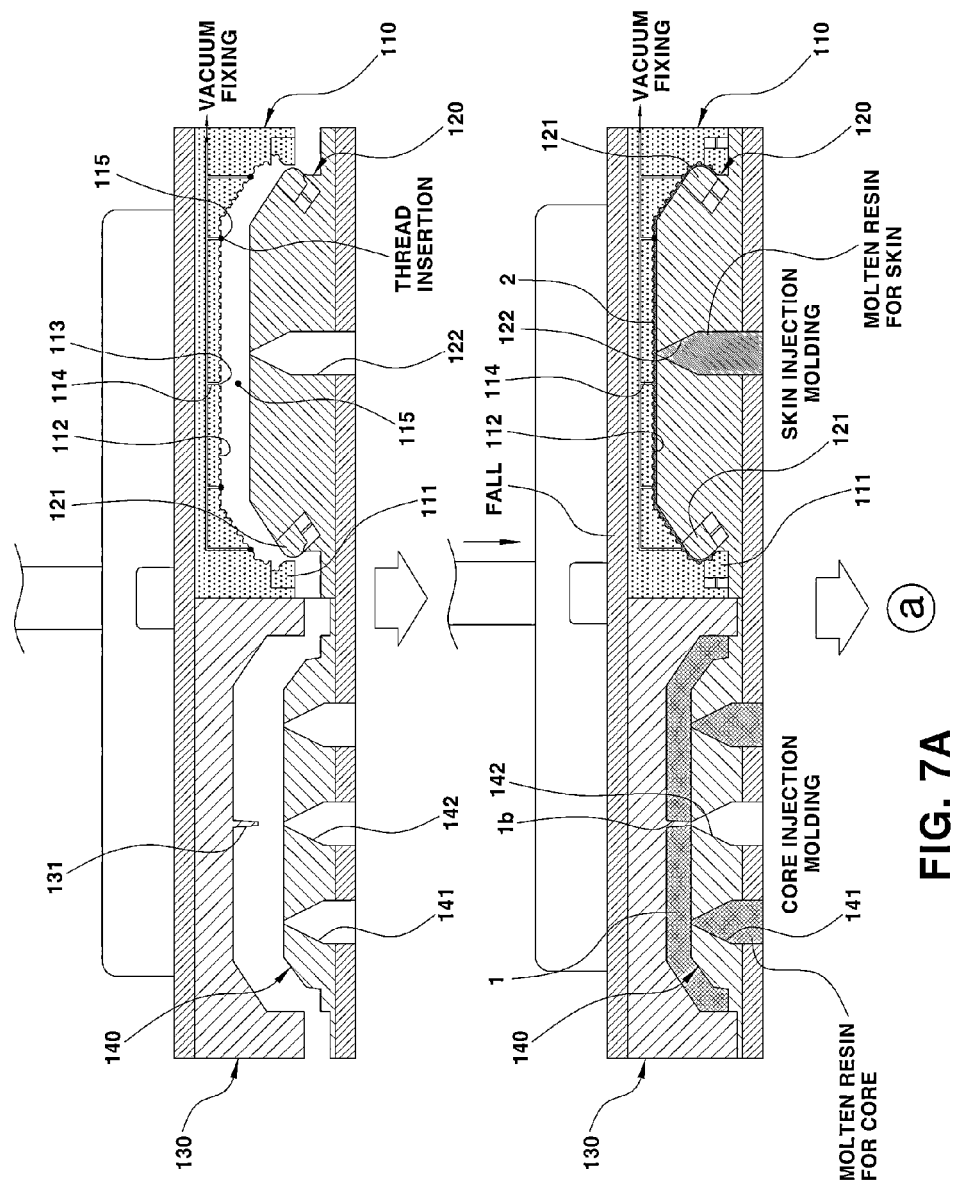
FIGS. 7A and 7B are exemplary cross-sectional views illustrating a configuration of a crash pad manufacturing apparatus according to an exemplary embodiment of the present invention.
Figure 7B:
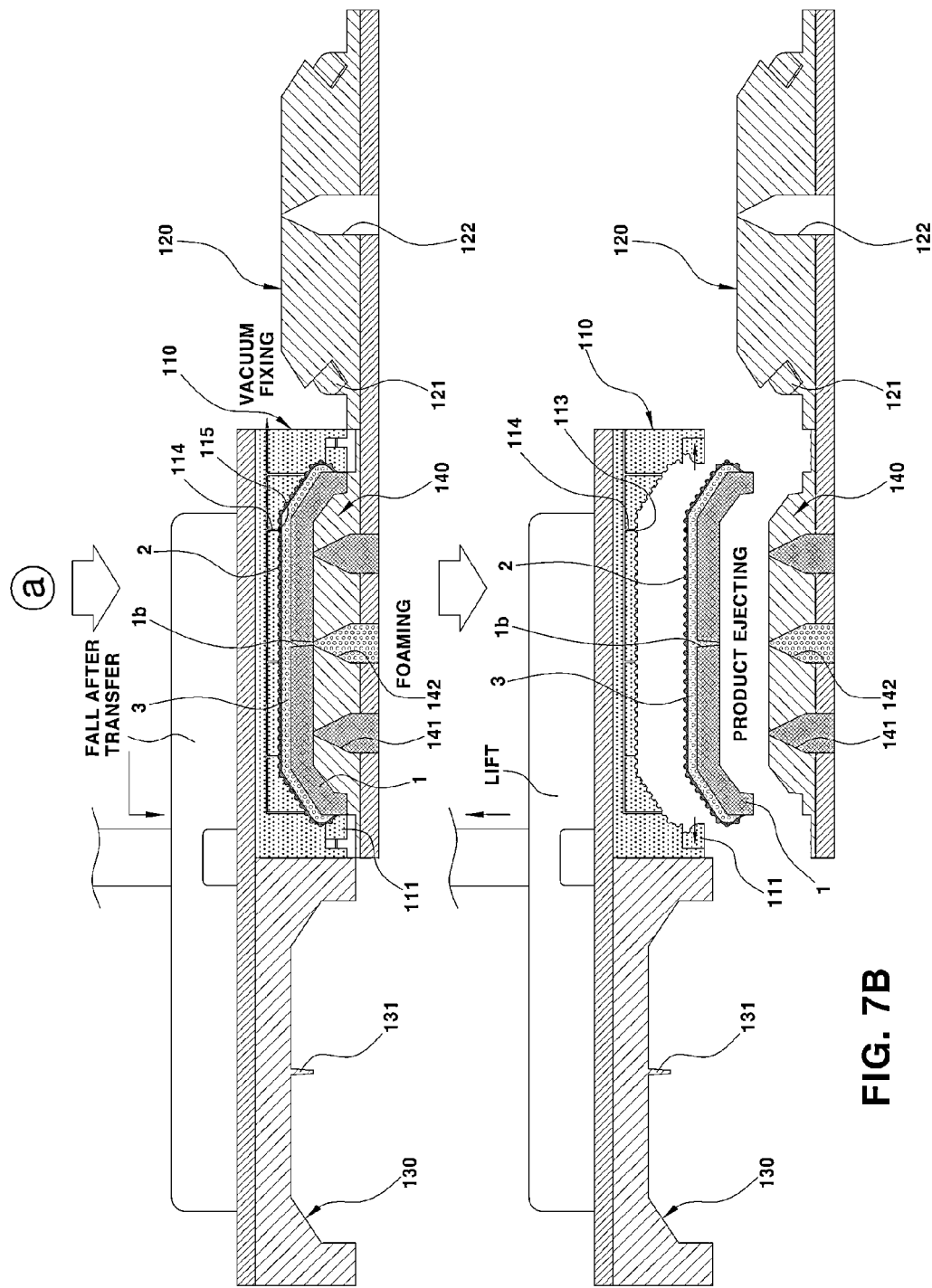

FIGS. 7A and 7B are exemplary cross-sectional views illustrating a configuration of a crash pad manufacturing apparatus according to an exemplary embodiment of the present invention, which also show a manufacturing process by stages.

FIG. 7A illustrates a thread adsorbed and fixed to an upper mold and an injection of a core and a skin. FIG. 7B illustrates a foaming and an ejecting of a product. As shown in FIGS. 7A and 7B, a crash pad manufacturing apparatus according to an exemplary embodiment of the present invention may include an upper mold 110 and a lower mold 120 that form a skin, and an upper mold 130 and a lower mold 140 that form a core.

Hereinafter, the upper mold 110 and the lower mold 120 that form the skin will be referred to as a first mold and a second mold, and the upper mold 130 and the lower mold 140 that form the core will be referred to as a third mold and a fourth mold.

The first mold 110 may become a steel injection mold as described above. In particular, the second mold 120 may also become a steel injection mold. The third mold 130 and the fourth mold that form the core may be similar to a typical configuration for injecting a core 1, and may also become a steel injection mold.

However, when the first mold 110 attached with a skin 2 that is injection molded and the fourth mold 140 with the core 1 injection molded are combined, a foaming cavity that forms a foaming layer 3 may be formed between the skin 2 and the core 1. The first mold 110 and the fourth mold 140 may also be used as a mold for foaming (see foaming of FIG. 7B). In other words, when the first mold 110 and the fourth mold 140 are combined, a cavity between the core 1 and the skin fixed to the mold may be a foaming cavity (e.g., forming cavity for foaming layer) in which the foaming may be performed. Thus, a product (e.g., crash pad) with a stack structure of the skin 2, the foaming layer 3, and the core 1 may be manufactured. Additionally, the foaming cavity may form a space sealed by a slide mold 111 of the first mold 110. The slide mold 111 of the first mold 110 may adhere an edge portion of the skin 2 closely to an edge portion of the core 1 to seal the edge portion of the foaming cavity.

Since the fourth mold 140 may be used as a lower mold for foaming as well as core forming, the fourth mold 140 may include an injection passageway 141 for injecting molten polymer resin of a core material into the core forming cavity and a foaming liquid injection passageway 142 for injecting foaming liquid which is a material of the foaming layer into the foaming cavity. In particular, the foaming upper mold, i.e., the upper mold during the foaming process may become the first mold 110.

Additionally, foaming liquid may be injected from the lower side of the core 1 that is first formed through the foaming liquid injection passageway 142 disposed within the fourth mold 140. In particular, since the foaming liquid must be injected into a cavity, i.e., foaming cavity with the skin 2 thereover through the core 1, an aperture 1b may be formed in the core 1 to upwardly pass the foaming liquid before the foaming process.

Accordingly, to form the aperture 1b in the core 1, a pin part 131 may downwardly protrude from the inner surface of the third mold 130 by a substantial core forming thickness at a location (corresponding to the foaming liquid injection passageway in a closed state of mold) corresponding to the foaming liquid injection passageway 142 of the fourth mold 140. Thus, when the third mold 130 and the fourth mold 140 are combined into a closed state (e.g., a combined state), the pin part 131 of the third mold 130 may be located at the foaming liquid injection passageway 142 of the fourth mold 140 within the core forming cavity (e.g., cavity of mold) between both molds. In particular, when molten resin (e.g., injection liquid) that is a core material may be injected through the injection passageway 141, the core 1 with the aperture 1b formed by the pin part 131 may be formed.

In each mold described above, the first mold 110 and the third mold 130 that are the upper molds may be a female type of mold, and the second mold 120 and the fourth mold 140 that are the lower molds may be a male type of mold.

On the other hand, when the first mold 110 and the second mold 120 that form the skin may form a skin forming cavity (e.g., cavity of mold) when combined, and as shown in FIG.

7b, molten resin (e.g., injection liquid) that is a skin material may be injected into the skin forming cavity defined by the two molds to form the skin 2. Thus, an injection passageway 122 may be disposed in the second mold 120 to inject molten resin into the skin forming cavity.

In this embodiment, a material having a low viscosity at a molten state, e.g., PP/SEBS-based TPO that is a mixed resin of polypropylene (PP) and styrene-ethylene-butadiene-styrene (SEBS) may be used as a material for manufacturing the skin. Additionally, an embossment 112 may be formed in the inner surface of the first mold 110. The embossment 112 may be a concave embossment similar to the nickel electroforming mold used in a typical vacuum adsorption forming method.

However, in the first mold 110 according to this embodiment, the embossment 112 that forms a typical stitch part may be omitted. Instead, an actual thread may be used to form a stitch on the skin surface, and the thread may be fixed on the inner surface of the first mold 110 prior to the skin injection.

In an exemplary embodiment, a fixing groove 113 may be longitudinally formed along a part where the thread 115 is adsorbed and fixed on the inner surface of the first mold 110, and the thread may be inserted into and seated in the fixing groove 113. The fixing groove 113 may be longitudinally formed along substantially the entire part where the thread 115 is fixed on the inner surface of the first mold 110. In particular, the fixing groove 113 may be formed in such a depth or width that only a sectional portion of the thread 115 may be inserted into the fixing groove 113. In other words, the fixing groove 113 may be formed in such a depth or width that only a sectional portion of the thread 115 may be inserted and the other portion of the thread 115 may protrude to the exterior (see FIG. 8).

Furthermore, vacuum apertures 114 may be disposed in the inner surface of the first mold 110 at a predetermined interval along the fixing groove 113. The vacuum apertures 114 may adsorb and fix the thread 115 on the inner surface of the mold (see FIG. 8). In this embodiment, the inlet of the vacuum aperture 114 disposed in the inner surface of the fixing groove 113 may have a circular shape or an oblong shape along the longitudinal direction (e.g., longitudinal direction of the fixing groove) of the thread 115.

The vacuum apertures 114 may extend from the inlet located on the inner surface (e.g., inner surface of the fixing groove) of the mold to the inside of the mold to join into one passageway 114, and then may be connected to a vacuum pump (not shown) that is an external vacuum pressure providing unit via a hose or a tube. Thus, when a vacuum pressure is applied to the vacuum aperture 114 by the vacuum pump, the thread 115 may be adsorbed and fixed to the inner side of the fixing groove 113 via a vacuum suctioning force applied through the vacuum aperture 114. In particular, the thread 115 may be adsorbed and fixed to fully block the inlet of the vacuum aperture 114 to prevent the molten resin for the skin injection forming, i.e., injection liquid of the skin material from penetrating into the vacuum aperture 114.

To prevent the penetration of the molten resin into the vacuum aperture, the inlet of the vacuum aperture 114 may be formed a size and shape that fully blocks the inlet of the vacuum aperture 114 by the thread 115 adsorbed and fixed to the fixing groove 113. For example, the inlet of the vacuum aperture 114 may have a diameter (e.g., when the inlet is circular) or a width (e.g., when the inlet is oblong in one direction) smaller than the diameter of the thread 115 (see FIG. 8).

Figure 8:
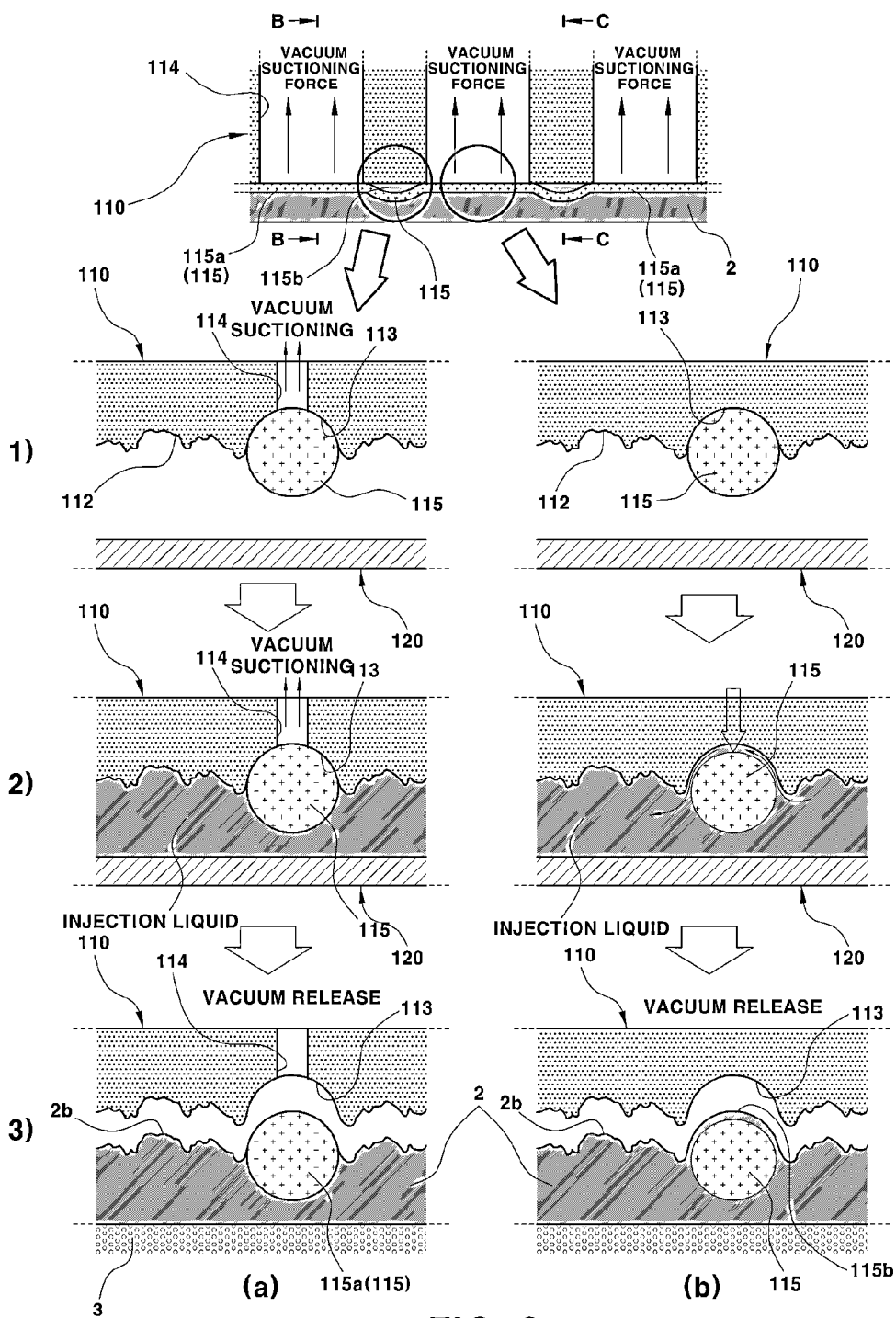
FIG. 8 is an exemplary cross-sectional view illustrating a process of forming an exposure part and a hidden part of a stitch according to an exemplary embodiment of the present invention.

FIG. 8 illustrates: 1) the thread 115 adsorbed and fixed to the inner side of the fixing groove 113 by a suctioning force applied through the vacuum aperture 114 before the skin forming; 2) the injection molding of the skin performed by injecting injection liquid while the thread 115 is blocking the vacuum aperture 114; and 3) a product ejected by releasing vacuum when the foaming layer 3 is formed after the injection of the core and the skin 2.

Thus, when the thread 115 may be adsorbed and fixed to the fixing groove 113 of the first mold 110, and the skin is injection-molded, then a stitch may be formed while the thread 115 is being attached to the surface of the skin 2 that is molded, and thus the actual thread may enable the stitch (115a and 115b of FIG. 9) on the skin surface. In particular, the vacuum pressure may maintain the blocking condition of the vacuum aperture 114 by the thread 115 while fixing the location of the thread 115 inserted into the fixing groove 113. In this condition, the vacuum pressure may operate as a fixing force that blocks the vacuum aperture 114 to prevent the injection liquid from penetrating into the vacuum aperture 114.

Additionally, the vacuum pressure may adsorb and fix the thread 115 into the fixing groove 133 to prevent the entire thread from completely penetrating into the injection liquid, and may assist the skin fixing by applying a vacuum suction force to the skin 2 through the vacuum aperture 114 when the skin 2 that is injection molded is transferred to the foaming process (e.g., the first mold is transferred to the fourth mold and then combined therewith; see FIGS. 7A and 7B). In this process, since only a smaller vacuum pressure that may adsorb only the thread 115 and the skin 2 need be provided, a substantially small capacity of vacuum pump and tank may be used compared to a related art (e.g., a substantially large suctioning force required to form embossment in a related art is not needed)

Additionally, since the skin 2 is injection molded, a heater needed for the vacuum adsorption forming may be omitted. The freedom degree of the embossment shape may also be enhanced. Since the skin 2 may be manufactured by the injection molding, a sharp shape or an undercut shape may be implemented along the embossment shape of the first mold 110 to form the skin, and a deformation due to shrinkage or rebounding occurring after molding by the vacuum adsorption method may be prevented.

On the other hand, a slide mold 111 may be disposed within the first mold 110 to be movable forward and backward for the sealing of the foaming cavity. The slide mold 111 may move forward under the control of a controller (not shown) during the foaming process, supporting the skin 2 transferred to the foaming process after the molding to fix the skin 2 to the first mold 110 and sealing an edge portion of the foaming cavity by adhering and fixing an edge portion of the skin 2 closely to an edge portion of the core 1 in the foaming process.

Since the slide mold 111 may adhere the skin 2 closely to the core 1 at the edge portion of the foaming cavity, the slide mold 111 may be disposed along the edge portion of the foaming cavity of the mold. In particular, since the slide mold 111 needs to move forward to seal the edge portion of the foaming cavity, the slide mold 111 may include a plurality of divided molds disposed along the circumference of the foaming cavity.

Additionally, the slide mold 111 may move forward and backward via a cylinder unit (not shown), and may move forward and backward along with the reciprocating motion of a piston rod of the cylinder unit.

Furthermore, a slide mold 121 may be disposed separately within the second mold 120. The slide mold 121 may operate similarly to the slide mold 111. The slide mold 121 of the second mold 120 may move forward and backward in an oblique direction. In this configuration, when the first mold 110 and the second mold 120 are in closed state (e.g., combined state), the slide mold 111 of the first mold 110 and the slide mold 121 of the second mold 120 may seal the skin forming cavity when moving forward.

In particular, the slide mold 111 of the first mold 110 may seal the skin forming cavity, and may form a skin forming cavity that corresponds to the skin shape, the edge portion of which may be inwardly bent. Additionally, the slide mold 121 of the second mold 120 may be a separate slide mold that seals the skin forming cavity together with the slide mold 111 of the first mold 110.

The slide molds 111 and 121 may form a portion of the skin forming cavity when moving forward. When the slide mold 111 of the first mold 110 and the slide mold 121 of the second mold 120 both move forward, upon injection molding of the skin as shown in FIG. 7A, the slide mold 111 and the slide mold 121 may vertically engage with each other while maintaining a gap substantially equal to the thickness of the skin.

In particular, the front end portion of the slide mold 111 of the first mold 110, which has a concave shape, may form a portion of the skin that is inwardly bent, and thus the skin shape, the edge portion of which is inwardly bent, may be formed (see the skin injection molding of FIG. 7a). In other words, when the slide mold 111 of the first mold 110 horizontally moves toward the center and the slide mold 121 of the second mold 120 obliquely moves (e.g., rises vertically), the first and second molds 111 and 121 may engage with each other, enabling the edge portion of the skin 2 to have the shape described above.

Hereinafter, a process of manufacturing a crash pad using the molding apparatus having the configuration described above will be described in detail with reference to FIGS. 7A and 7B.

First, a vacuum pressure may be applied to the vacuum aperture 114 of the first mold 110 that forms the skin by driving a vacuum pump, and then a unique color of thread 115 may be inserted into and seated in the fixing groove 113 to allow the thread 115 to be adsorbed and fixed to the fixing groove 113 via a vacuum suctioning force applied through the vacuum apertures 114 disposed at a predetermined interval (see the first view of FIG. 7A) In particular, the thread 115 may have the same color as the skin 2, or may have a different unique color from that of the skin 2.

Thereafter, the first mold 110 and the second mold 120, and the third mold 130 and the fourth mold 140 may be combined, and when the slide molds 111 and 121 disposed within the first mold 110 and the second mold 120 move forward, molten resin of the core material and molten resin of the skin material may be injected through the injection passageways 121 and 141 of the second mold 120 and the fourth mold 140, respectively, to simultaneously injection mold the core 1 and the skin 2 (see the second view of FIG. 7A).

Furthermore, when the foaming is completed, the slide mold 121 of the second mold 120 may move backward, and then the first mold 110 and the third mold 130 may be lifted to open each mold. The first mold 110 and the fourth mold 140 used as the foaming mold may be combined by moving the molds, and then the foaming layer 3 may be formed by injecting foaming liquid through the foaming liquid injection passageway 141 of the fourth mold 140 (see the first view of FIG. 7B). In particular, when the slide mold 111 of the first mold 110 moves forward, the skin 2 and the core 1 may be adhered closely to each other to seal the edge portion of the foaming cavity, and foaming liquid may be prevented from leaking by injecting foaming liquid into the sealed foaming cavity.

Thereafter, the first mold 110 and the third mold 130 may be lifted to open each mold, and then a product (e.g., the crash pad) may be ejected (see the second view of FIG. 7B). Since the skin 2 may be maintained at an adhesion state with the surface of the core 1 while being fixed by foaming liquid at the edge portion of the ejected product (e.g., no leakage of foaming liquid), a separate skin cutting process or skin end finishing process (e.g., end enfolding process) may be omitted.

FIG. 8 is an exemplary view illustrating a process of forming a stitch on the surface of the skin using a thread. In FIGS. 8A and 8B, the first view on the top illustrates the thread 115 adsorbed and fixed to the inner side of the fixing groove 113 via a suctioning force applied through the vacuum aperture 114 before the skin forming process. The second view illustrates the injection molding of the skin performed when the thread 115 blocks the vacuum aperture 114. The third view illustrates a product ejected by releasing vacuum when the foaming layer 3 is formed after the injection of the core and the skin 2.

The thread 115 may be adsorbed by the vacuum apertures 114 disposed at a predetermined interval, and then the skin 2 may be injection molded. Thus, the thread 115 may be fixed on the surface of the skin 2, and a portion of the thread 115 may be exposed to the surface of the skin 2 to form the stitch.

The crash pad manufactured according to this exemplary embodiment may have a stitch including an exposure part 115a in which the thread 115 may be exposed on the surface of the skin 2 and a hidden part 115b in which the thread 115 may be inserted (e.g., buried) in the surface of the skin 2. In particular, the exposure part 115a of the stitch may be a portion where the thread 115 is exposed on the surface of the skin 2, and the hidden part 115 of the stitch may be a portion where the thread 115 is covered by the skin material (see FIG. 9).

Upon injection molding, at least a sectional portion of the thread 115 may be inserted into the injection liquid, and then may be fixed in the surface of the molded skin 2 while being inserted into the skin 2. In particular, when the injection liquid is injected while the thread 115 is being fixed to the inner side of the fixing groove 113 of the first mold 110, a first portion of the thread 115 adsorbed to the vacuum aperture 114, i.e., a first portion of the thread 115 that blocks the vacuum aperture 114 may be adhered closely to the surface of the mold 110 via the vacuum suctioning force applied through the vacuum solution 114. Accordingly, the first portion of the thread 115 may prevent a penetration of injection liquid between the thread 115 and the mold 110 (see FIG. 8A). Thus, since the injection liquid may not penetrate between the thread 115 and the mold 110 at the first portion of the thread 115 adsorbed to the vacuum aperture 114, the sectional upper part of the thread 115 may be exposed to the exterior from the surface of the skin 2. Accordingly, the first portion of the thread 115 may become the exposure part 115a exposed to the exterior from the surface of the skin 2 that is molded.

On the other hand, a second portion of the thread 115 not directly adsorbed to the vacuum aperture 114 may be fully inserted in the skin 2 due to the penetration of the injection liquid between thread 115 and the mold 110, and thus the section upper part of the thread 115 may not be exposed but hidden from the outside. In particular, a portion of the skin surface that is formed to cover the thread due to the penetration of the injection liquid may become the hidden part 115b, and the hidden part 115b may be inserted to prevent being exposed when viewed from the exterior.

In brief, since the thread 115 may be adhered closely to the vacuum aperture 114 such that injection liquid does not penetrate upon injection molding of the skin 2, a first portion of thread 115 exposed to the exterior of the skin surface may become the exposure part 115a. In addition, since the thread 115 may be buried by the injection liquid penetrating upon injection molding of the skin 2, a second portion of the skin material covering the thread 115 may become the hidden part 115b.

As shown in FIG. 8A, since the thread 115 blocks the vacuum aperture 114 while being adhered closely to the inner surface of the fixing groove 113 via a vacuum suctioning force, injection liquid may not penetrate between the mold 110 and the thread 115 during the injection, and thus the sectional upper part of the thread 115 may be exposed to the exterior of the surface of the skin 2, i.e., may become the exposure part 115a.

In addition, as shown in FIG. 8B, the injection liquid may penetrate into a portion where the vacuum suctioning force does not directly act, particularly, a gap with a substantially low suction force, i.e., a gap between the inner surface of the fixing groove 113 of the mold 110 and the thread 115. In this case, the injection liquid that penetrates may push down the thread 115, and cover the upper part of the thread 115. Thus, the thread 115 may be inserted into the surface of the skin 2 that is molded, and may not be exposed to the exterior at the hidden part 115b.

Figure 9:
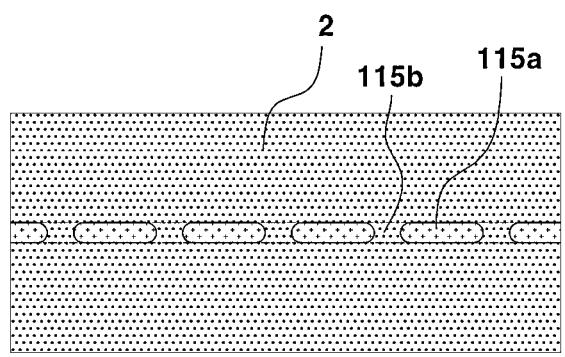
FIG. 9 is an exemplary view illustrating the surface of a skin manufactured according to an exemplary embodiment of the present invention.

FIG. 9 illustrates a thread fixed to the surface of the skin. As shown in FIG. 9, the exposure part 115 in which the thread is exposed to the exterior by a predetermined length and the hidden part 115b in which the thread is externally hidden at a predetermined interval may exist on the surface of the skin 2.

It has been described in the above that a portion of the thread adhered closely to the mold (e.g., inner surface of the fixing groove 113) 110 such that the injection liquid does not penetrate by the vacuum suctioning force applied through the vacuum aperture 114 may become the exposure part 115, and the a portion formed by the penetration of the injection liquid between the mold 110 and the thread 115 due to a low suctioning force may become the hidden part 115b. The length of the exposure part 115a and the hidden part 115b may be adjusted based on the size and interval of the vacuum apertures 114 and the vacuum suctioning force.

Particularly, although the size and interval of the vacuum apertures 114 may be preset after the manufacture of the mold, a section where the injection liquid may not penetrate may be formed at a portion of the thread that does not correspond to the vacuum aperture 114 of the mold 110 by adjusting the sizes of the vacuum pressure and the vacuum suctioning force, and furthermore, the length of the section where the injection liquid penetrates may be adjusted.

Accordingly, the length and interval of the exposure part 115a and the length and interval of the hidden part 115b may be adjusted. In addition, as the vacuum suctioning force increases, the length of the exposure part 115a and the interval of the hidden part 115b may increase. On the other hand, as the vacuum suctioning force decreases, the length of the hidden part 115b and the interval of the exposure part 115a may increase. In particular, the vacuum suctioning force may be applied to such an extent that the injection liquid may not penetrate into the vacuum aperture 114 while the thread 115 is substantially blocking the vacuum aperture 114.

The apparatus and method for manufacturing a crash pad according to an exemplary embodiment of the present invention may improve the productivity and decrease the costs for equipment and manufacturing by reducing the number of molds, the number of installation components and the number of processes and omitting the handwork, and may increase the degree of freedom of embossment design on the surface of a skin while overcoming an excessive loss due to a leakage of foaming liquid.

Particularly, since the skin may be manufactured by injection molding, a smaller capacity of vacuum pump and tank may be used, and a heater may be omitted. Additionally, various embossment patterns may be formed on the surface of the skin. The realistic feeling of a stitch may be improved by implementing a stitch part formed on the surface of the skin using an actual thread.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. An apparatus for manufacturing a crash pad with a foaming layer formed by injecting foaming solution between a core and a skin, the apparatus comprising:
   a first mold and a second mold that form the skin by injecting molten resin of a skin material into a skin forming cavity when the first and second molds are combined; and
   a third mold and a fourth mold that form the core by injecting molten resin of a core material into a core forming cavity when the third and fourth molds are combined,
   wherein the first mold has a plurality of vacuum apertures formed along a longitudinal direction of a thread and formed on an inner surface of the first mold to adsorb and fix a thread for implementing a stitch before forming of the skin, and each of the vacuum apertures exerts a vacuum suctioning force for adsorbing and fixing by a vacuum pressure applied from a vacuum pressure providing unit,
   wherein each of the vacuum apertures is disposed at a predetermined interval along the longitudinal direction of the thread such that a first portion of the thread is adsorbed and fixed by the vacuum suctioning force of the plurality of vacuum apertures to form an exposure part of the stitch in which the thread is exposed on a surface of the skin and a second portion of the thread is not adsorbed to the plurality of vacuum apertures to form a hidden part of the stitch in which the thread is buried in the surface of the skin.

2. The apparatus of claim 1, wherein the first mold fixed with the molded skin and the second mold attached with the molded core are used as a foaming mold to form a foaming cavity between the skin and the core when the first mold and the second mold are combined.

3. The apparatus of claim 1, wherein a fixing groove is formed along a first portion of the inner surface of the first mold where the thread is seated and fixed, and a suctioning inlet of each vacuum aperture is disposed in the inner surface of the fixing groove.

4. The apparatus of claim 3, wherein the fixing groove has a depth or a width into which the first portion of the thread is inserted and a second portion of the thread protrudes to an exterior.

5. The apparatus of claim 1, wherein each of the vacuum apertures has a suctioning inlet disposed in the inner surface of the first mold, and the suctioning inlet has a circular shape or an oblong shape along the longitudinal direction of the thread.

6. The apparatus of claim 1, wherein each of the vacuum apertures has a suctioning inlet disposed in the inner surface of the first mold, and the suctioning inlet has a size and shape to be blocked by the thread to prevent the molten resin of the skin material from penetrating therein.

7. The apparatus of claim 6, wherein the suctioning inlet of each of the vacuum apertures has a diameter or a width smaller than a diameter of the thread.

8. The apparatus of claim 1, further comprises:
a slide mold disposed within the first mold to form a portion of the skin forming cavity and moves to seal the skin forming cavity,
wherein the slide mold is configured to form the skin forming cavity corresponding to a shape of the skin, an edge portion of which is inwardly bent.

9. The apparatus of claim 8, further comprises:
a separate slide mold disposed within the second mold to form a portion of the skin forming cavity and moves to seal the skin forming cavity.

10. The apparatus of claim 9, wherein the slide mold of the first mold is movable forward and backward in a horizontal direction, and the slide mold of the second mold is movable forward and backward in an oblique direction.

11. The apparatus of claim 9, wherein the slide mold of the first mold and the slide mold of the second mold vertically engage with each other while maintaining a gap corresponding to a thickness of the skin when the skin forming cavity is sealed.

12. The apparatus of claim 11, wherein the slide mold of the first mold has a concave shape at a front end portion thereof that forms the edge portion of the skin that is inwardly bent.

13. The apparatus of claim 8, wherein the slide mold is configured to seal a foaming cavity by adhering the edge portion of the skin to an edge portion of the core when the first mold and the fourth mold are combined.

\* \* \* \* \*